(12) United States Patent
Browne et al.

(10) Patent No.: US 9,057,528 B2
(45) Date of Patent: Jun. 16, 2015

(54) UTILIZING GASEOUS FLOW TO REDIRECT PARTICULATE MATTER

(75) Inventors: Alan L. Browne, Grosse Pointe, MI (US); Nancy L. Johnson, Northville, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 1179 days.

(21) Appl. No.: 13/013,003

(22) Filed: Jan. 25, 2011

(65) Prior Publication Data
US 2011/0117830 A1    May 19, 2011

Related U.S. Application Data

(63) Continuation-in-part of application No. 12/607,178, filed on Oct. 28, 2009.

(51) Int. Cl.
| | | |
|---|---|---|
| *F24F 9/00* | (2006.01) | |
| *B60J 9/04* | (2006.01) | |
| *B60J 10/00* | (2006.01) | |

(52) U.S. Cl.
CPC ... *F24F 9/00* (2013.01); *B60J 9/04* (2013.01); *B60J 10/0034* (2013.01)

(58) Field of Classification Search
CPC ............ B60J 9/00; B60J 9/04; B60J 2005/00; B60J 10/0034; F24F 9/00
USPC .......................... 454/192, 188, 95–98, 70, 238
See application file for complete search history.

(56) References Cited

U.S. PATENT DOCUMENTS

| | | | | |
|---|---|---|---|---|
| 3,527,152 | A * | 9/1970 | McGowan et al. ............. | 454/95 |
| 3,747,500 | A * | 7/1973 | Redd ............................. | 454/123 |
| 4,450,755 | A * | 5/1984 | Catan ........................... | 454/188 |
| 4,928,580 | A * | 5/1990 | McIntyre et al. ............. | 454/123 |
| 4,989,499 | A * | 2/1991 | Scoccia et al. ................. | 454/70 |
| 5,072,658 | A * | 12/1991 | Bogage ......................... | 454/188 |
| 5,419,005 | A * | 5/1995 | Mori .............................. | 15/313 |
| 5,546,630 | A * | 8/1996 | Long ............................. | 15/313 |
| 5,591,078 | A * | 1/1997 | Filion et al. ................... | 454/124 |
| 5,765,635 | A * | 6/1998 | Rhee ............................. | 165/203 |
| 5,992,162 | A * | 11/1999 | Heinle et al. ..................... | 62/90 |
| 6,135,874 | A * | 10/2000 | Weber ........................... | 454/124 |
| 6,249,931 | B1 * | 6/2001 | Sato ............................... | 15/313 |
| 6,470,698 | B2 * | 10/2002 | Nishi et al. ..................... | 62/239 |
| 6,603,662 | B1 * | 8/2003 | Ganrot .......................... | 361/698 |
| 6,775,994 | B1 * | 8/2004 | Math et al. ...................... | 62/89 |
| 6,960,129 | B2 * | 11/2005 | Ashley et al. ................. | 454/188 |
| 7,093,817 | B2 * | 8/2006 | MacGregor et al. ............ | 251/11 |
| 7,158,863 | B1 * | 1/2007 | Johnson ........................ | 700/278 |
| 7,178,395 | B2 * | 2/2007 | Browne et al. ............. | 73/170.11 |
| 7,204,472 | B2 * | 4/2007 | Jones et al. .............. | 251/129.06 |
| 7,441,414 | B2 * | 10/2008 | Ziehr et al. ...................... | 62/244 |
| 7,681,630 | B2 * | 3/2010 | Klassen et al. ................ | 165/202 |

(Continued)

FOREIGN PATENT DOCUMENTS

| | | | | |
|---|---|---|---|---|
| JP | 61096349 | A * | 5/1986 | |
| JP | 61295453 | A * | 12/1986 | |
| JP | 2004058929 | A * | 2/2004 | |
| JP | 2005349979 | A * | 12/2005 | |
| JP | 2007153076 | A * | 6/2007 | |

*Primary Examiner* — Steven B McAllister
*Assistant Examiner* — Frances F Hamilton

(57) ABSTRACT

A method of and system for preventing particulate matter, such as debris, precipitation, and condensation from occupying a space or accumulating upon a surface by directly engaging the surface or creating an air-curtain effect adjacent the space utilizing a selectively actuated gaseous flow.

9 Claims, 4 Drawing Sheets

(56) References Cited

U.S. PATENT DOCUMENTS

| | | | |
|---|---|---|---|
| 7,734,381 B2 * | 6/2010 | Conger et al. | 700/301 |
| 8,702,481 B1 * | 4/2014 | Wilbourn et al. | 454/96 |
| 2005/0197057 A1 * | 9/2005 | Rohrer et al. | 454/191 |
| 2005/0282485 A1 * | 12/2005 | Kato et al. | 454/136 |
| 2006/0172694 A1 * | 8/2006 | Gau et al. | 454/333 |
| 2008/0178526 A1 * | 7/2008 | Browne et al. | 49/82.1 |
| 2009/0291627 A1 * | 11/2009 | Zimmermann et al. | 454/188 |
| 2010/0120350 A1 * | 5/2010 | Pucciani | 454/188 |

* cited by examiner

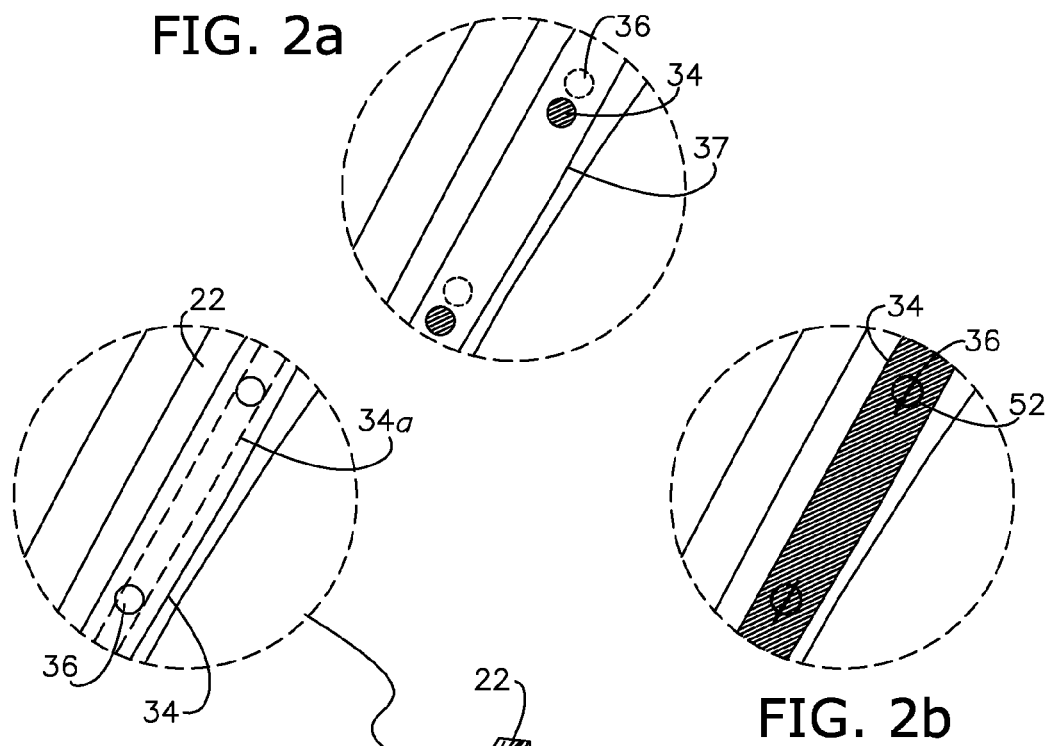
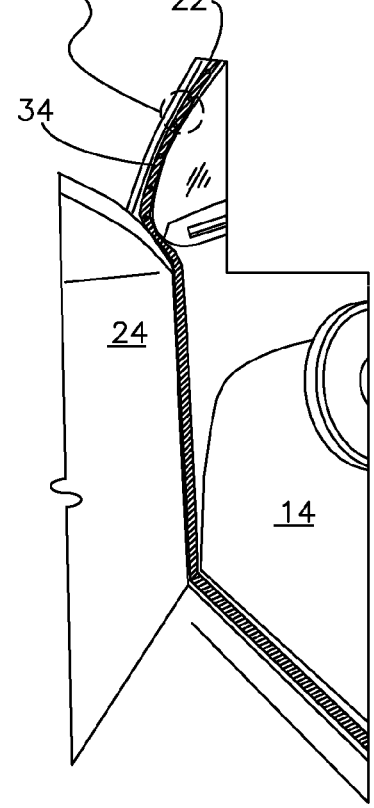
FIG. 2

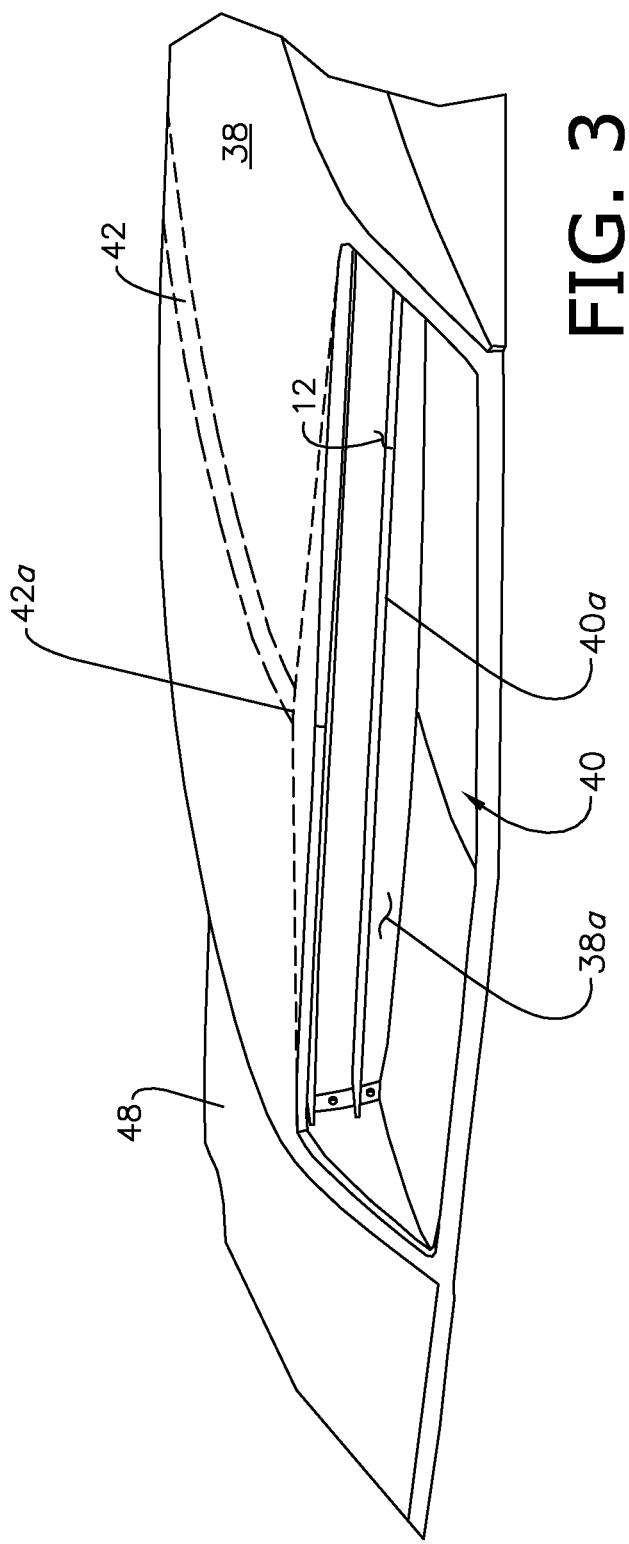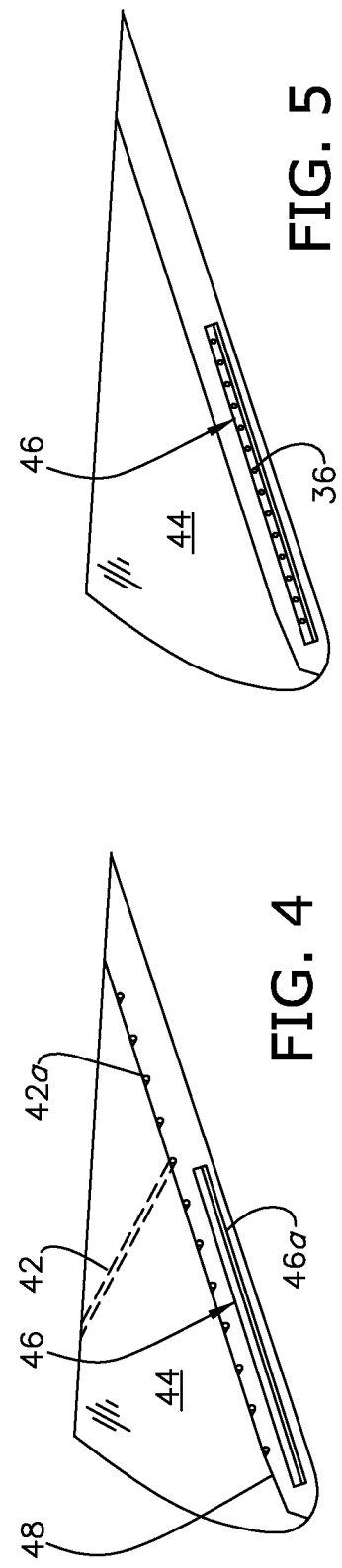

UTILIZING GASEOUS FLOW TO REDIRECT PARTICULATE MATTER

CROSS-REFERENCES TO RELATED APPLICATIONS

This U.S. Non-Provisional patent application is a continuation-in-part and claims the benefit of pending U.S. Non-Provisional application Ser. No. 12/607,178 filed on Oct. 28, 2009, and entitled "AIR CURTAIN," which is incorporated by reference herein.

BACKGROUND OF THE INVENTION

1. Field of the Invention

The present invention relates generally to methods of preventing accumulation onto a surface or entry into a space by debris, precipitation, condensation, droplets of liquid (e.g., splash), and/or otherwise particulate matter (collectively referred to herein as "particulates" or "particulate matter"), and more particularly, to methods that accomplish this by utilizing actuated gaseous flows to redirect the particulates.

2. Discussion of Prior Art

It has long been appreciated that particulate matter may undesirably occupy a surface or space. For example, in a vehicular setting, particular concerns include snow intrusion into the vehicle interior upon door opening, and ingestion of significant amounts of water into the engine in forward facing air intake systems, such as hood scoops for turbochargers. When this occurs, it is further appreciated that the functionality of the surface or the inner workings of the space may become compromised. Moreover, objects and individuals in the space may be covered or otherwise discomforted by the invading particulates. Conventional measures have been developed that address some of these concerns, which include wiper mechanisms, exterior trim components such as gutters or dams, and covers that selectively overlay the space. These measures, however, are often aesthetically displeasing, add mass and/or complexity, which in a vehicular setting may affect fuel economy, increase costs related to maintenance and repair, and are often ineffective or unavailable due to, for example, limitations in packaging requirements, and the need to maintain the ingress/egress of the space.

BRIEF SUMMARY OF THE INVENTION

Responsive to these and other concerns, the present invention recites methods of and systems for utilizing an actuated gaseous flow to inhibit particulates from occupying a space or surface. As such, the invention is useful for protecting interior spaces from intruding particulates and for eliminating accumulations on surfaces, while reducing mass, complexity, and/or costs, in comparison to prior art particulate removal or redirection techniques. Moreover, the invention provides novel means for redirecting particulates that require less packaging space, in comparison to the prior art, and as such are more suitable for use in crowded regions.

In air curtain embodiments, the invention is useful for enabling the redirection of particulates away from, while maintaining the ingress/egress of the protected space. In air intake embodiments, the invention is useful for cleaning the grille/shutter system, and preventing particulates from entering the air supply, which in a vehicular application, is further useful for maintaining proper fuel-air mixture and fuel economy. Finally, the invention is yet further useful for allowing removal of particulates in areas which may be difficult to clean or are otherwise inaccessible when needed; for example, in a vehicular headlight/tail-lamp application, the invention enables accumulated snow or sleet to be removed while operating the vehicle.

Thus, the invention generally concerns a multiple-step method, comprising positioning a gas supply device operable to selectively produce a gaseous flow relative to a space or surface. When produced, the flow is of sufficient rate and energy to be able to redirect particulate matter from entering the space or accumulating on the surface. Next, a condition indicative of particulate matter imminently attempting to enter the space or accumulate on the surface is determined. Finally, when the condition is determined, the gaseous flow is produced, so as to redirect any encountered debris, precipitation, and/or accumulation away from the space or surface. Further aspects of the invention include systems employing active material actuation, and utilizing a gaseous flow to remove particulate matter from vehicular structures, such as windshield wipers, headlights, and air intake grilles and supplies.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 2 is a perspective view of an interior cabin of a vehicle, and protection system including a gas supply device fluidly coupled to a seal defining a plurality of orifices, in accordance with a preferred embodiment of the invention;

FIG. 2a is a segmental view of a perforated membrane overlaying the seal and defining a plurality of openings configured to be selectively aligned with the orifices, in accordance with a preferred embodiment of the invention;

FIG. 2b is a segmental view of a seal defining plural orifices, wherein each orifice is lined with a shape memory material operable to open and close the orifice when activated and deactivated, in accordance with a preferred embodiment of the invention;

FIG. 3 is a perspective view of air intake defining an inlet, and comprising a plurality of grille vanes defining an exterior surface, and a protection system including a gas supply device operable to engage the surface and/or inlet with a gaseous flow, in accordance with a preferred embodiment of the invention;

FIG. 4 is a segmental view of a protection system comprising a gas supply device defining an outlet adjacent a windshield and/or wiper assembly, and configured to engage the windshield and/or wiper assembly with a gaseous flow, in accordance with a preferred embodiment of the invention;

FIG. 5 is a segmental view of a windshield, and protection system comprising a gas supply device fluidly coupled to and defined in part by a wiper assembly, and configured to engage the windshield, and/or wiper assembly with a gaseous flow, in accordance with a preferred embodiment of the invention.

DETAILED DESCRIPTION OF THE INVENTION

Figure 1:
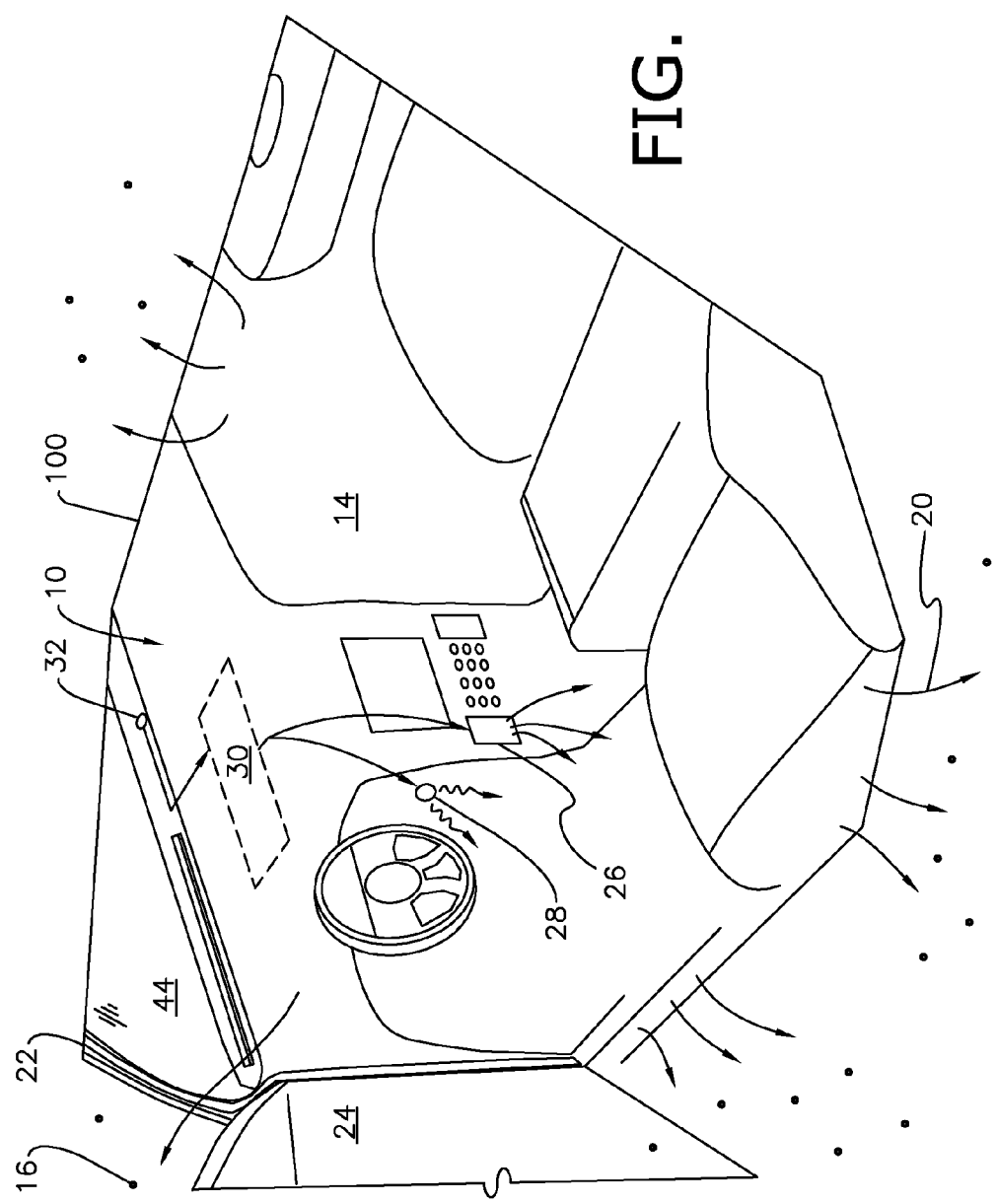
FIG. 1 is a perspective view of an interior cabin of a vehicle including a pressure relief valve, a sensor, and a heating, ventilation, and air conditioning ("HVAC") system composing an air curtain protection system, in accordance with a preferred embodiment of the invention.

The present invention concerns a protection system 10 and method of protection, variously depicted in the illustrated embodiments (FIGS. 1-6) to prevent the accumulation upon a surface 12, or entry into a space 14 by debris, precipitation, condensation, droplets of liquid, or otherwise particulate matter (i.e., "particulates") 16. The inventive system 10 utilizes a gas supply device 18 to produce a gaseous, more preferably a laminar gaseous, and most preferably, a laminar and sheet gaseous flow 20 that redirects particulates 16 away from the space 14 or surface 12. As shown and described herein, the invention is suitable for use in vehicular applications; however, it is well within the ambit of the invention to utilize the system 10 or similar systems in other settings, such as with respect to residential and commercial structures. For example, it is appreciated that such a system 10 may be incorporated into the entry structure of a building and configured to selectively direct a gaseous flow 20 towards the feet or shoes of an entrant into the building, so as to remove snow, slush, dirt, sand, or mud therefrom. The examples presented herein are illustrative only, and are not intended to limit the scope of the present invention.

In the illustrated embodiments, it is appreciated that the term "gaseous flow" particularly contemplates air flow, such that a separate quantity of gas (e.g., a replaceable container of pressurized gas) is not necessary to effect the intended function of the system 10, provided that abundant access to air is afforded the gas supply device 18.

Referring to FIG. 1, where a structural shell 22 defines the space 14 and an opening for permitting the ingress/egress of the space 14, and the shell 22 is selectively engaged by a panel 24 configured to overlay the opening, so as to form a barrier to particulates 16; and for example, in a vehicular application, where the structural frame 22 of the vehicle 100 defines a passenger cabin space 14, and a panel 24 is used to open and close the cabin space 14, the gaseous flow 20 presents an air curtain effect or functions to reduce the negative pressure caused by a swinging panel 24. It is appreciated that the panel 24 may be a door, window, sunroof, hatchback, trunk lid, hood, or any movable barrier used to isolate a space from external conditions. As previously described, it is also appreciated that conventionally opening a swing panel 24, such as a door, often creates a negative pressure or suction that drives nearby air-borne particulates into the space 14.

As such, in a first embodiment, the system 10 functions to increase the inside cabin pressure, so as to equilibrate or cause a small net positive pressure between the cabin space 14 and external conditions. To that end, the gas supply device 18 may selectively employ the heating, ventilation, and air conditioning ("HVAC") system 26 and/or active pressure relief valves ("PRV") 28 of a vehicle 100 so equipped, to accomplish such change in interior cabin pressure (FIG. 1). In one example, active PRV's having positive seals 28 may be used to maintain an increased pressure inside the cabin 14, generated, for example, by normal vehicular use, or selectively by or in combination with operation of the HVAC system 26. This causes an outward flow of air, when the panel 24 is swung to the open condition, and as such, any particulate matter 16 adjacent the opening to be redirected away from the interior space 14, thus, producing an air-curtain effect. Alternatively, the PRV's 28 may be caused to open in anticipation of or upon opening a swing panel 24, so as to significantly reduce the drop in pressure experienced in the cabin space 14. That is to say, by opening the valves 28, the negative pressure generated by a swing door 24 will draw air into the cabin space 14 through the opened valves 28, instead of creating a pressure drop.

Also shown in FIG. 1, and applicable throughout the invention, the system 10 is preferably configured to determine an imminent attempt by particulate matter 16 to enter the space 14 or accumulate upon a surface 12, and as such, may include a controller 30 programmably configured to anticipate such conditions. For example, in a vehicular application, the controller 30 may be configured to determine a shift in gear from drive to park, the activation of a door lock indicative of a swing door opening event, actuation of a wiper system, or other event indicative of an attempt, and cause the gas supply device (in this configuration, the HVAC and/or PRV system) 18 to actuate when the event is determined. More preferably, a sensor 32 is communicatively coupled to the controller 30 and operable to detect data further indicative of an imminent attempt or actual accumulation. For example, the sensor 32 may be an external sensor operable to detect precipitation or dusty conditions, so that for example, the system 10 only actuates where both snow, rain, or dust is detected by the sensor 32 and a swing door opening event is anticipated by the controller 30, e.g., via activation of a door lock.

FIG. 2 depicts another air-curtain embodiment, wherein a separate gas supply device 18 is fluidly coupled to a tubular seal 34 defining at least one orifice 36. More particularly, the tubular seal 34 defines a hollow core 34a that is fluidly coupled to the orifice 36, and gas supply device 18. The seal 34 is fixed to the structural shell 22 along the perimeter of the opening, and engages the panel 24 when the panel 24 is in the closed condition. The entire seal 34, or just the sections thereof proximate the upper edges of the opening (FIG. 2), that extend around the perimeter may be used to define the orifices 36. In a preferred embodiment, the seal 34 is configured such that the orifices 36 are overlaid and blocked by the panel 24, when closed.

In this embodiment, the device 18 may be a blower or the like that is fluidly coupled to outside air, for example, through the air intake 38 (FIG. 3). In a passive mode, as the vehicle 100 moves, the air intake 38 channels air into the gas supply device 18 and causes air to fill the seal 34 and result in the intended function of the invention, as well as increased sealing force incidental thereto. In this configuration, the device 18 may further function as a backflow preventer, or check valve which retains the forced air in the seal 34. In another example, the device 18 is configured to draw air from outside and into the seal 34 autonomously or on-demand. Upon determining an imminent or actual door opening, additional high pressure air could be supplied to the seal 34 which would increase the effectiveness of the air curtain and also provide the additional benefit of reducing door opening effort, also incidental. In either configuration, when the panel 24 is opened, a gaseous flow 20 of air is caused to discharge through the orifices 36, thereby redirecting particulates away from the opening and space 14.

In another example, the orifices 36 may be covered, unless the presence of particular matter is detected, by selectively sliding a perforated membrane 37 whose holes could be aligned with those in the seal 34 (FIG. 2a). The membrane 37 may be disposed within or external to the seal 34. Finally, it is appreciated that the seal 34 may alternatively be fixed to the panel 24 and configured to engage the shell 14, when the panel 24 is caused to achieve the closed condition.

In another embodiment, it is appreciated that the device 18 may be fluidly coupled to the air intake 38 of a vehicle 100, and configured to direct a gaseous flow 20 thereto, so as to protect at least one surface 12 defined by the intake 38 or otherwise form an air curtain that protects the air supply entering therein. FIG. 3 depicts a system 10 configured to dislodge particulates accumulated upon an air intake grille/shutter system 40 operable to achieve open and closed conditions, so as to free, for example, the grille vanes 40a from snow, slush, ice or dirt. A gas supply tube or conduit 42 is fixedly coupled to or defined by the intake 38 and defines one or more outlets 42a in proximity to the grille vanes 40a or inlet 38a of the intake 38. In one example, the vanes 40a themselves may define the terminal end(s) of a plurality of gas supply conduits 42. More preferably, the vanes 40a and/or intake 38 may define a slotted orifice 36, so as to produce a laminar sheet flow.

The supply tube(s) 42 is fluidly coupled to the gas supply device 18, and as throughout the embodiments preferably configured to direct the flow 20 at a downward angle, more preferably, between thirty and sixty, and most preferably, at a forty-five degree angle with horizontal, so as to reduce accidental particulate blow back into the space 14 while maintaining an effective barrier. Thus, the system 10 in this configuration may function to engage the vanes 40a or other intake surface 12 with the flow 20; or, may effect an air-curtain at the inlet 38a operable to divert particulates, for example, towards the sides of the intake 38.

FIGS. 4 and 5 depict plural embodiments of a system 10 configured to redirect particulate matter away from a surface 12 defined by a windshield 44 (or other glazing) and/or wiper assembly (i.e., "wiper") 46 comprising a wiper blade 46a. In FIG. 4, the gas supply tube 42 and more preferably, a plurality of gas supply tubes 42 terminate adjacent the windshield 44 and wiper assembly 56 and is fluidly coupled to a gas supply device 18. When actuated, a gaseous flow 20 is generated by the gas supply device 18 and engages the surface 12. To that end, the tube 42 may be entrained along the under-side of the hood 48, and positioned such that the outlet 42a terminates near the proximal edge of the hood 48 but not past it. In this configuration, the outlet 42a is generally protected by the hood 48, and operable to direct the flow 20 towards the base of the windshield 44 and the wiper assembly 46. The outlet 42a may present any suitable configuration, and for example may present a circular funnel or flat divergent flared-end section (FIG. 3) that defines a slot equal in width with the surface 12. In FIG. 5, the wiper assembly 46 defines the terminal portion of the tube(s) or conduit(s) 42, and the outlet 42a; and more preferably, defines a plurality of orifices 36. Here, it is appreciated that the flow 20 is able to engage more of the windshield 44 as the wiper 46 sweeps during actuation. Moreover, in this configuration, the wiper blade 46a is more directly engaged by the flow 20. Thus, it is appreciated that the tube 42 must be flexible so as to enable wiper function.

Figure 6:
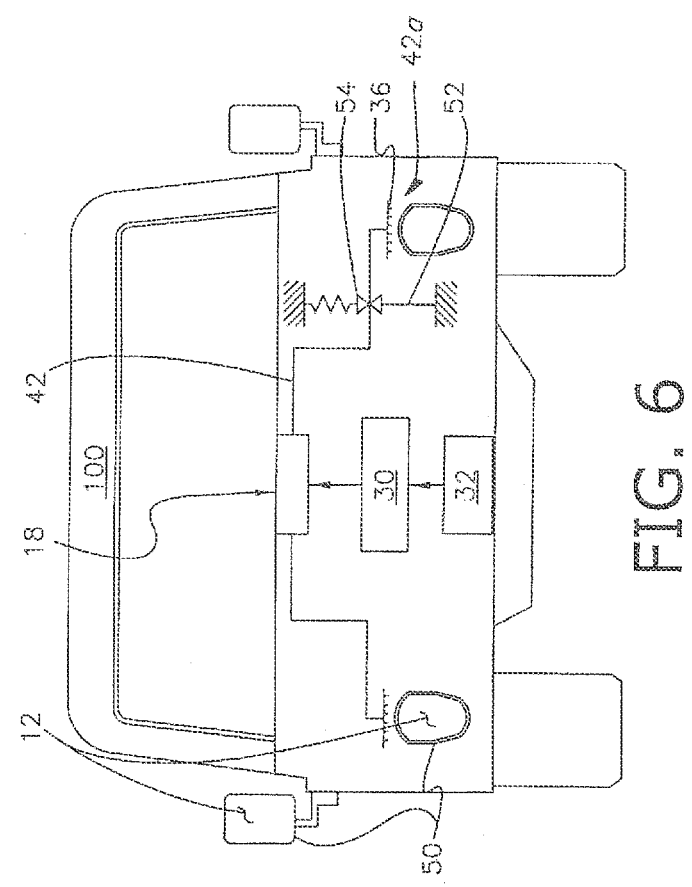
FIG. 6 is an elevation of a vehicle comprising rear tail-lamps defining exterior surfaces, and a protection system including a gas supply device operable to engage each surface with a gaseous flow, and an active material actuator communicatively coupled to the device, in accordance with a preferred embodiment of the invention.

Lastly, FIG. 6 presents another vehicular application, wherein an external feature, such as a vehicular headlight, tail-lamp, camera, rearview mirror, etc. 50 defines the surface 12. Here, again, a gas supply tube or conduit 42 is fluidly coupled to a gas supply device 18 (e.g., blower) and defines an outlet 42a from which a gaseous flow 20 is discharged. The tube 42 may be entrained within the headlight bracket, radiator housing, or quarter panel (not shown), for example. The outlet 42a is positioned proximate the surface 12, so as to maximize engagement between the surface 12 and flow 20 and deter clogging or contamination. The flow 12, preferably moving in a laminar fashion, is then able to dislodge particulate matter 16, such as snow, and dirt from the surface 12 of the headlight 50.

In each of the embodiments, the system 10 is preferably actuated by an active material actuator 52 communicatively coupled to the gas supply device 18, wherein the term "active material" shall be afforded its ordinary meaning as understood by those of ordinary skill in the art and includes any material or composite that exhibits a reversible change in a fundamental (e.g., chemical or intrinsic physical) property when exposed to or occluded from an external signal source. Suitable active materials for use with the present invention include but are not limited to shape memory alloys, shape memory polymers, piezoelectric polymers, piezoelectric ceramics, electroactive polymers, combinations of the foregoing materials, and the like. For example, and as also depicted in FIG. 6, wherein is a separate gas supply device 18, an active material actuator 52 (an example of which is a shape memory alloy wire) may be drivenly coupled to a valve 54 intermediate the outlet 42a or orifices 36, and the device 18, such that when activated, the gas supply device 18 causes the gaseous flow 20 to be emitted.

Active material actuation may be employed in other manners as well. For example, with respect to the gas supply device 18 incorporated active materials may be used to pressurize an accumulator (e.g., with piezo-pumps or EAP diaphragm pumps); and a shape memory material (e.g., SMA wire actuator, EAP tendon or actuator) may line or otherwise engage the perimeter of each orifice 36, so as to actively open and close the orifice 36 directly (FIG. 2b). In this configuration, the orifice 36 forming structure (e.g., tube 42, seal 34, etc.) is formed of a stretchable or malleable medium, and the shape memory material presents first and second memorized shapes, wherein the first shape collapses into a tight slit so as to generally close the orifice 36, and the second shape presents a circular cross-section to maximize discharge.

Moreover, in each of the afore-mentioned embodiments, it is appreciated that heat from the engine compartment, for example, may be used to increase the temperature of the gaseous flow 20, thus improving the ability of the flow 20 to redirect, melt, or evaporate particulates 16, such as snow, ice, and condensation. In another aspect of the invention, the flow 20 may be used to manipulate the surface 12, so as to, for example, cause the panel 24 or intake grille vanes 40a to close at a predetermined condition (e.g., to avoid ingestion of water into the intake 38).

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A method for utilizing an actuated gaseous flow to inhibit debris, precipitation, and/or condensation from occupying a space defined by an occupant cabin of a vehicle, the method comprising the steps of:
   positioning a gas supply device relative to the space or a surface;
   communicatively coupling the gas supply device to a pressure relief valve;

fluidly coupling the gas supply device to the space wherein the device is operable to selectively produce a gaseous flow and the flow is operable to redirect debris, precipitation, and/or condensation from entering the space or accumulating on the surface, when produced;

determining an imminent instance of debris, precipitation and/or condensation entering the space or accumulating upon the surface;

detecting a pressure buildup inside the cabin;

actively opening or closing the pressure relief valve;

closing the pressure relief valve when the pressure buildup is detected; and producing the gaseous flow relative to the space or surface, so as to redirect the debris, precipitation, and/or condensation, when the instance is detected.

2. The method as claimed in claim 1, wherein the gas supply device includes a Heating, Ventilation, and Air Conditioning system, and the producing the gaseous flow step further includes selectively operating the Heating, Ventilation, and Air Conditioning system to create the gaseous flow.

3. The method as claimed in claim 1, wherein the space is defined by a structural shell and at least one movable panel shiftable between open and closed conditions, and the gas flow is operable to shift said at least one panel to the closed condition.

4. The method as claimed in claim 1, wherein the determining step further includes utilizing a sensor to detect the instance.

5. The method as claimed in claim 1, wherein the flow is a laminar flow.

6. The method as claimed in claim 1, wherein the flow is a sheet flow.

7. The method as claimed in claim 1, wherein the determining step further includes determining a condition selected from the group consisting of actuating a door lock, shifting a gear to park, actuating a wiper assembly, detecting precipitation, and detecting dust.

8. The method as claimed in claim 1, further comprising communicatively coupling an active material actuator to the gas supply device, the actuator operable to cause the device to create the gaseous flow.

9. The method as claimed in claim 8, wherein the active material actuator is formed from an active material selected from the group consisting of shape memory alloys, shape memory polymers, piezoelectric polymers, piezoelectric ceramics, electroactive polymers, and combinations thereof.

* * * * *